(12) United States Patent
Wallin et al.

(10) Patent No.: US 9,403,241 B2
(45) Date of Patent: *Aug. 2, 2016

(54) WELDING COMPOSITIONS FOR IMPROVED MECHANICAL PROPERTIES IN THE WELDING OF CAST IRON

(71) Applicant: Stoody Company, Bowling Green, KY (US)

(72) Inventors: Jack Garry Wallin, Scottsville, KY (US); Ravi Menon, Goodlettsville, TN (US)

(73) Assignee: Stoody Company, Chesterfield, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,704

(22) Filed: Jul. 1, 2013

(65) Prior Publication Data

US 2013/0294820 A1 Nov. 7, 2013

Related U.S. Application Data

(62) Division of application No. 11/113,404, filed on Apr. 22, 2005.

(51) Int. Cl.
*B23K 35/22* (2006.01)
*B23K 35/30* (2006.01)
*B23K 35/365* (2006.01)

(52) U.S. Cl.
CPC ........... *B23K 35/3033* (2013.01); *B23K 35/365* (2013.01); *Y10T 403/477* (2015.01)

(58) Field of Classification Search
CPC .... B23K 35/3033; B23K 35/365; B23K 9/23; B23K 35/30; C22C 38/32; C22C 38/22; C22C 38/24; C22C 38/26; C22C 38/28; C22C 38/38; C22C 38/54; C22C 38/005; C22C 38/06; F16L 9/02
USPC ............ 219/137 WM, 145.23, 146.1, 146.23, 219/146.24; 148/426, 24; 228/101, 119; 420/441–460

See application file for complete search history.

(56) References Cited

U.S. PATENT DOCUMENTS 457,205 A 5/1890 Marbeau
1,580,662 A 4/1926 Girin
(Continued)

FOREIGN PATENT DOCUMENTS

DE 2437247 B * 9/1975
GB 783387 9/1957
(Continued)

OTHER PUBLICATIONS

International Search Report and Written Opinion of the International Searching Authority, dated Jul. 25, 2006, pp. 1-3, International Application No. PCT/US2006/015419, European Patent Office, Rijswijk.

*Primary Examiner* — Phuong Nguyen

(57) ABSTRACT

A weld deposit produced from a coated welding electrode for use in welding cast irons is provided by the present invention. Preferably, in one form of the present invention, the weld deposit composition comprises between approximately 54% and approximately 60% Nickel, between approximately 3.5% and approximately 5.5% Manganese, and between approximately 0.9% and approximately 1.4% Carbon. The weld deposit is preferably formed by using a coated welding electrode having a coating composition between approximately 0.3% and approximately 4.0% Magnesium and rare earth metals and oxides. The resulting weld deposit exhibits improved ductility, fracture toughness, and resistance to cracking.

5 Claims, 4 Drawing Sheets

(56) References Cited

U.S. PATENT DOCUMENTS

| | | | |
|---|---|---|---|
| 1,708,815 A | * | 4/1929 | Wille .................. 219/146.24 |
| 1,794,983 A | | 3/1931 | Ritter |
| 1,838,130 A | | 12/1931 | Beckinsale |
| 2,108,050 A | * | 2/1938 | Birger et al. .................. 420/587 |
| 2,133,291 A | | 10/1938 | Gordon |
| 2,266,762 A | | 12/1941 | Jerabeck |
| 2,499,827 A | | 3/1950 | Kihlgren |
| 2,529,346 A | * | 11/1950 | Dwight et al. .................. 420/20 |
| 2,626,339 A | * | 1/1953 | Wasserman .................. 219/146.52 |
| 2,855,333 A | | 10/1958 | Wasserman et al. |
| 2,856,281 A | | 10/1958 | Cremer et al. |
| 2,880,086 A | | 3/1959 | Cape |
| 3,108,020 A | | 10/1963 | Van Der Willigen et al. |
| 3,145,466 A | * | 8/1964 | Feduska .................. 228/194 |
| 3,196,537 A | | 7/1965 | Groman et al. |
| 3,231,709 A | | 1/1966 | Foley |
| 3,259,970 A | * | 7/1966 | Fujimori et al. .................. 228/224 |
| 3,334,996 A | | 8/1967 | Foster et al. |
| 3,404,999 A | | 10/1968 | Tanzman et al. |
| 3,582,408 A | | 6/1971 | Onyshkevych |
| 3,663,214 A | | 5/1972 | Moore et al. |
| 3,720,504 A | * | 3/1973 | Frehn .................. 75/237 |
| 3,778,588 A | | 12/1973 | Bishel |
| 3,801,311 A | * | 4/1974 | Church et al. .................. 420/405 |
| 3,843,356 A | | 10/1974 | Renschen et al. |
| 3,851,142 A | | 11/1974 | Bishel |
| 3,851,143 A | | 11/1974 | Bishel |
| 3,876,856 A | * | 4/1975 | Bouvard .................. 219/146.1 |
| 3,909,253 A | * | 9/1975 | Asnis et al. .................. 420/455 |
| 3,919,519 A | | 11/1975 | Petersen |
| 3,948,615 A | * | 4/1976 | Gray .................. 428/328 |
| 3,986,867 A | | 10/1976 | Masumoto et al. |
| 3,995,139 A | | 11/1976 | Bouvard |
| 4,043,843 A | | 8/1977 | Tanczyn |
| 4,052,203 A | * | 10/1977 | Larson et al. .................. 420/25 |
| 4,087,673 A | | 5/1978 | Kiilunen |
| 4,103,067 A | | 7/1978 | Jackson et al. |
| 4,111,691 A | * | 9/1978 | Larson et al. .................. 420/581 |
| 4,122,817 A | | 10/1978 | Matlock |
| 4,225,768 A | | 9/1980 | Seifahrt |
| 4,251,711 A | | 2/1981 | Tanigaki et al. |
| 4,294,614 A | | 10/1981 | Kotecki |
| 4,394,560 A | * | 7/1983 | Kishida et al. ......... 219/137 WM |
| 4,396,822 A | * | 8/1983 | Kishida et al. ......... 219/137 WM |
| 4,415,530 A | | 11/1983 | Hunt |
| 4,426,426 A | * | 1/1984 | Muhlberger .................. 428/682 |
| 4,426,428 A | | 1/1984 | Kammer et al. |
| 4,439,498 A | * | 3/1984 | Sadowski .................. 428/558 |
| 4,534,793 A | | 8/1985 | Olson et al. |
| 4,700,863 A | * | 10/1987 | Filippi et al. .................. 220/613 |
| 4,726,854 A | | 2/1988 | Olson et al. |
| 4,772,773 A | * | 9/1988 | Hashimoto et al. ...... 219/121.64 |
| 4,790,473 A | * | 12/1988 | Narasimhan et al. ......... 228/206 |
| 4,817,859 A | * | 4/1989 | Breitenmoser et al. ....... 228/226 |
| 4,888,253 A | * | 12/1989 | Snyder et al. .................. 428/680 |
| 4,940,882 A | * | 7/1990 | Bates .................. 219/146.22 |
| 4,994,235 A | * | 2/1991 | Shirosaki et al. .............. 420/495 |
| 4,994,640 A | | 2/1991 | Kiser |
| 5,091,624 A | * | 2/1992 | Alt et al. .................. 219/100 |
| 5,304,346 A | | 4/1994 | O'Donnell et al. |
| 5,308,698 A | * | 5/1994 | Bishel et al. .................. 428/385 |
| 5,422,071 A | | 6/1995 | Kiser |
| 6,232,000 B1 | * | 5/2001 | Singh et al. .................. 428/685 |
| 6,242,113 B1 | | 6/2001 | Kiser |
| 6,406,563 B2 | * | 6/2002 | Kawano et al. .............. 148/324 |
| 6,589,671 B1 | * | 7/2003 | Kehrer .................. 428/683 |
| 6,949,216 B2 | * | 9/2005 | Brice et al. .................. 264/401 |
| 2006/0237412 A1 | * | 10/2006 | Wallin et al. .......... 219/137 WM |

FOREIGN PATENT DOCUMENTS

| | | | |
|---|---|---|---|
| JP | 5 237691 | 9/1993 | |
| PL | 280768 A1 | 1/1991 | |
| PL | 159163 B1 * | 11/1992 | .......... B23K 35/365 |
| RU | 2 167 752 C1 | 5/2001 | |
| SU | 622609 | 9/1978 | |
| WO | WO 2006/116275 A1 | 11/2006 | |

* cited by examiner

WELDING COMPOSITIONS FOR IMPROVED MECHANICAL PROPERTIES IN THE WELDING OF CAST IRON

CROSS-REFERENCE TO RELATED APPLICATIONS

This application is a divisional of U.S. application Ser. No. 11/113,404 filed on Apr. 22, 2005. The disclosure of the above application is incorporated herein by reference.

FIELD

The present invention relates generally to welding electrodes and more particularly to weld deposit compositions that result in improved toughness, ductility, and resistance to cracking in the welding of cast irons.

BACKGROUND

Cast irons, a group of iron alloys containing over 2% Carbon, among other elements, are often used to form parts or components that subsequently undergo welding processes. The welding of cast irons presents certain issues relative to forming a welded structure that exhibits a sufficient level of mechanical properties such as toughness, ductility, and resistance to cracking, among others. For example, carbides often form in a fusion zone and a mixed zone of the weld and produce a weld deposit with reduced ductility and lower strength. Additionally, it is desirable to form austenite rather than martensite in the mixed zone since austenite reduces the formation of carbides. Like carbides, martensite reduces the ductility and strength of the weld and also becomes more brittle than the surrounding material.

Additionally, the amount of arc energy required to form a fusion zone directly affects the amount of carbides that can form. Generally, a higher amount of arc energy causes more heating of the base metal, which increases the penetration of the weld metal into the cast iron base metal. The deeper the penetration, the higher the carbon content and thus an increased amount of carbide formation at the weld interface.

Accordingly, a need exists in the art for welding electrodes and weld deposit compositions that result in improved ductility, fracture toughness, and resistance to cracking, among others, in the welding of cast iron.

SUMMARY

In one preferred form, a weld deposit produced from a coated welding electrode for use in welding cast irons is provided, the weld deposit composition comprising between approximately 54% and approximately 60% Nickel, between approximately 3.5% and approximately 5.5% Manganese, and between approximately 0.9% and approximately 1.4% Carbon. Further, the coated welding electrode comprises a coating composition comprising between approximately 0.3% and approximately 4.0% Magnesium and rare earth metals and oxides.

In another form, a weld deposit produced from welding cast irons is provided, the weld deposit composition comprising at least approximately 54% Nickel and being formed from a welding core wire comprising approximately 50% Nickel and approximately 50% Iron.

In other forms, a cast iron weld structure, a method of welding cast iron, and a welding wire for use in welding cast iron are provided, wherein a weld deposit is produced having a composition comprising at least approximately 54% Nickel and being formed from a welding core wire comprising approximately 50% Nickel and approximately 50% Iron.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present invention will become more fully understood from the detailed description and the accompanying photomicrographs, wherein.

Corresponding reference numerals indicate corresponding parts throughout the several views of the drawings.

DETAILED DESCRIPTION

The following description of the preferred embodiments is merely exemplary in nature and is in no way intended to limit the invention, its application, or uses.

Figure 1:
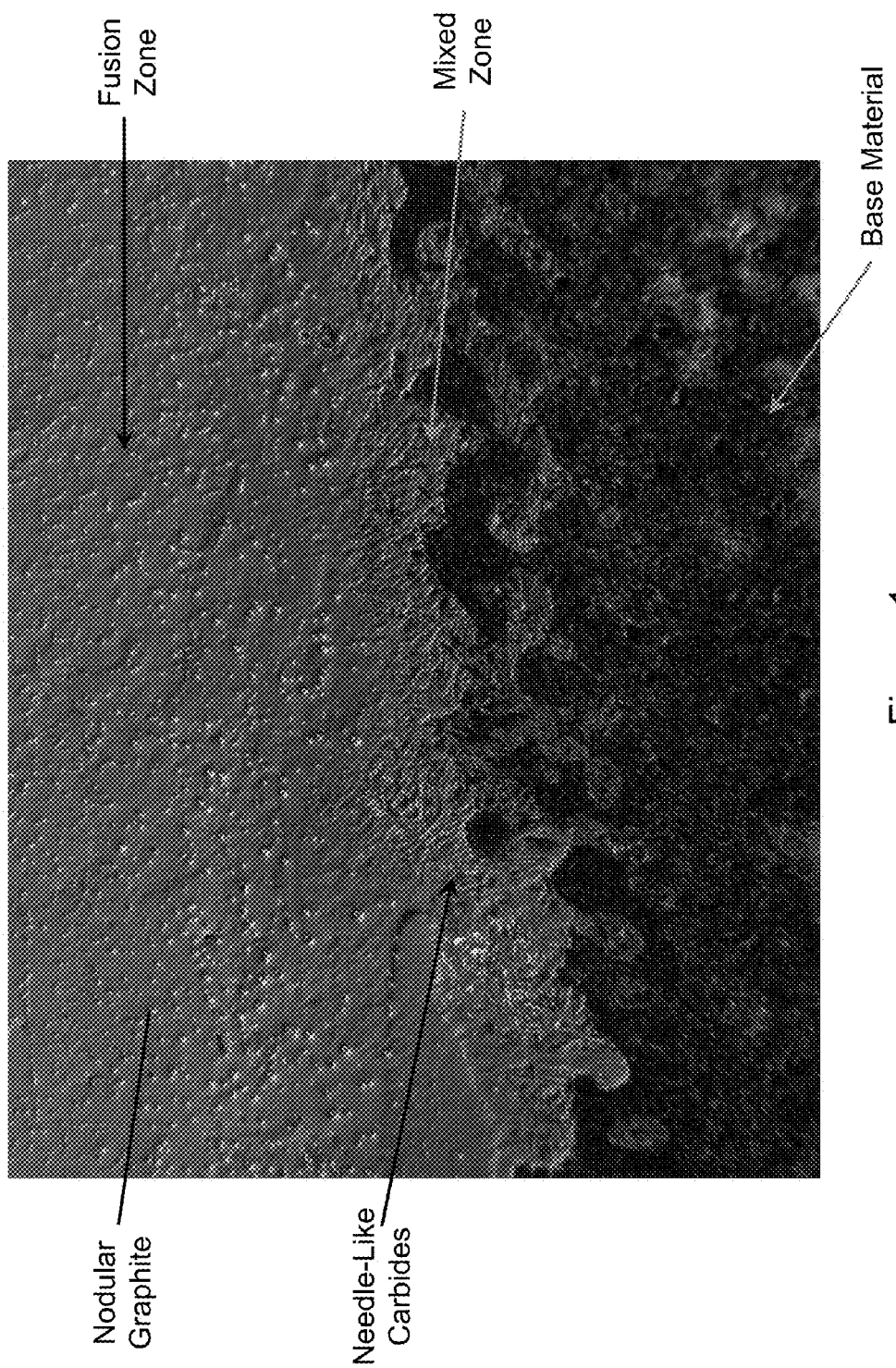
FIG. 1 is a photomicrograph of a prior art cast iron weld deposit illustrating needle-like carbides in the mixed zone.
Figure 2:
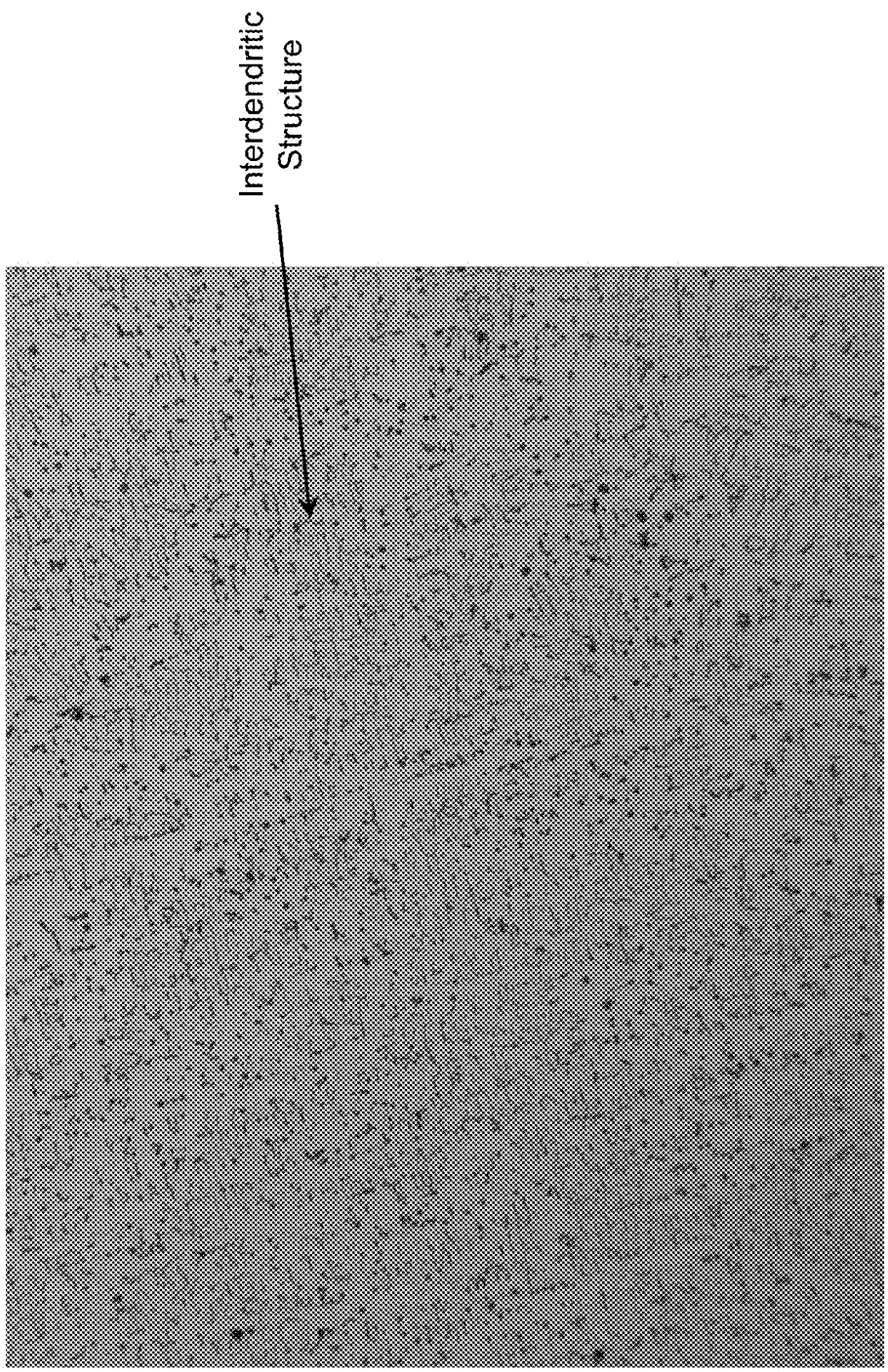
FIG. 2 is a photomicrograph of another prior art cast iron weld deposit illustrating an interdendritic structure.

Referring to FIGS. 1 and 2, prior art cast iron weld deposits are illustrated, wherein undesirable carbides and an interdendritic structure are formed near a weld. FIG. 1 illustrates undesirable needle-like carbides formed in the mixed zone, just above the base material, which reduces ductility and strength of the weld. Above these carbides is the fusion zone, in which nodular graphite is formed, which is desirable in a weld. However, the carbide formation is not desirable. FIG. 2 illustrates an interdendritic structure in the fusion zone of a cast iron weld. This interdendritic structure is also undesirable and reduces the strength and toughness of the weld.

In accordance with the principles of the present invention, a coated welding electrode for use in welding cast iron is provided that produces a weld deposit having improved ductility, fracture toughness, and resistance to cracking. Preferably, the coated welding electrode comprises a core wire having approximately 50% Nickel (Ni) and approximately 50% Iron (Fe). The core wire is coated with a composition comprising between approximately 0.3% and approximately 4.0% Magnesium (Mg), and rare earth metals and oxides. Since it is desirable that the weld deposit microstructure contain nodular graphite rather than an interdendritic structure, the Magnesium and rare earth elements in the coating composition act as nodularizing agents. Such a nodular microstructure improves the impact toughness of the weld deposit.

The resulting weld deposit composition comprises a minimum of approximately 54% Nickel and preferably between approximately 54% Nickel and approximately 60% Nickel. Additionally, the weld deposit composition comprises a minimum of approximately 3.0% Manganese (Mn) and preferably between approximately 3.5% Manganese and approximately 5.5% Manganese. Further, the weld deposit composition comprises a minimum of approximately 0.7% Carbon (C) and preferably between approximately 0.9% Carbon and approximately 1.4% Carbon.

Figure 3:
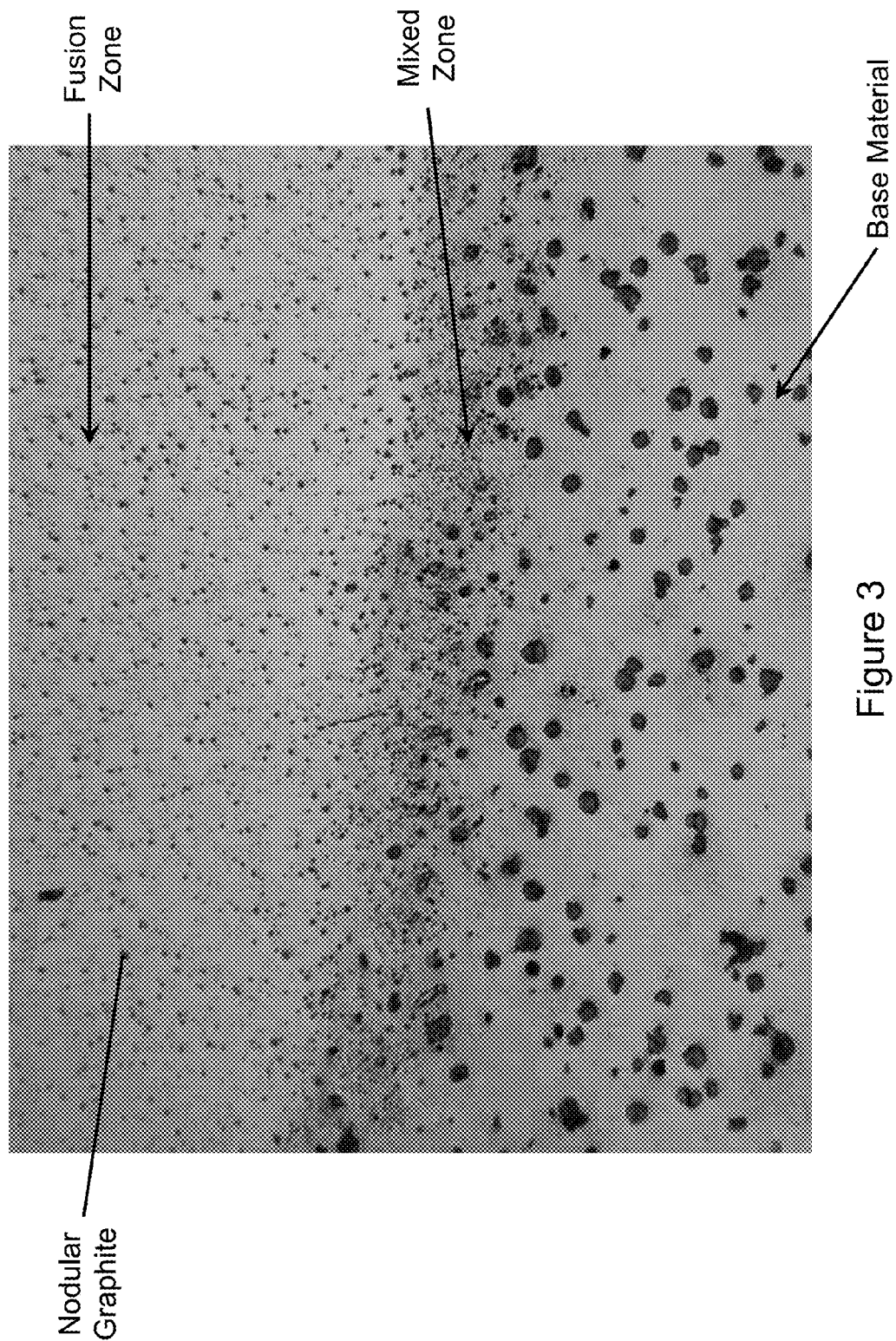
FIG. 3 is a photomicrograph of a cast iron weld deposit illustrating a carbide-free fusion zone in accordance with the principles of the present invention.
Figure 4:
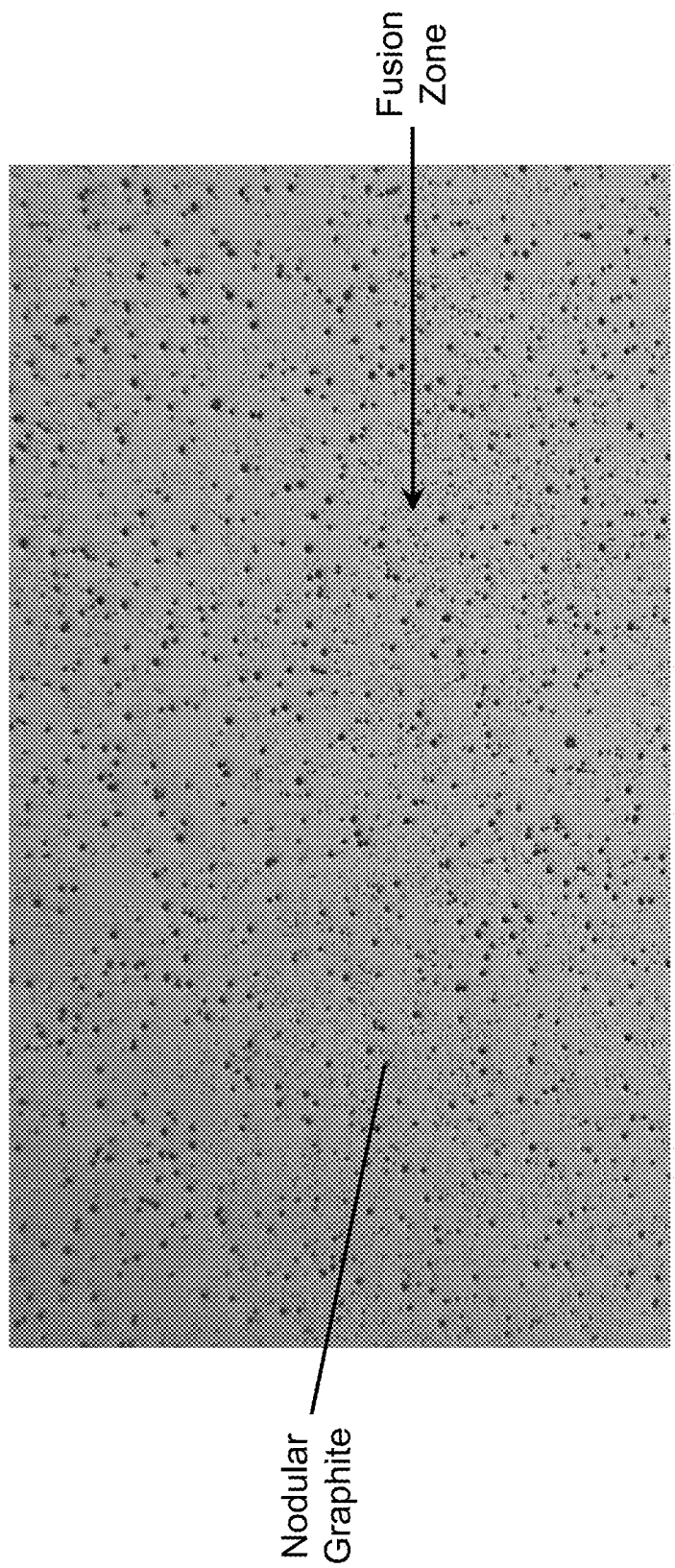
FIG. 4 is a photomicrograph of the fusion zone of the cast iron weld deposit of FIG. 3 illustrating nodular graphite in accordance with the principles of the present invention.

Referring to FIGS. 3 and 4, exemplary weld deposits according to the present invention are shown. As illustrated, the weld deposits are carbide-free in the fusion zone and the mixed zone, and throughout the weld structure. As further shown, the weld deposits do not exhibit an interdendritic structure, and instead, exhibit a high degree of nodular graphite. As shown in FIG. 3, the fusion zone does not contain any needle-like carbides as previously shown. Rather, the structure is nodular, which results in improved ductility and strength of the weld. FIG. 4 further illustrates the nodular graphite structure in the fusion zone. As illustrated by the carbide-free and nodular graphite structure, an improved weld deposit is provided in accordance with the teachings of the present invention.

Since Nickel is an austenitic phase stabilizer and austenite absorbs carbon rejected by the melted cast iron in the weld zone, the presence of Nickel reduces the amount of carbides formed in the weld. The addition of Manganese produces an austenite weld deposit, which also reduces the amount of carbides formed in the weld. Accordingly, the weld deposit has improved toughness, ductility, and strength.

In this preferred form, the weld deposit composition further comprises approximately 0.5% Silicon (Si), less than approximately 0.03% Sulfur (S), less than approximately 0.2% Copper (Cu), less than approximately 0.5% Aluminum (Al), and the remainder Iron. Silicon is added as a graphitizing agent, which improves weld metal ductility. Aluminum is added as a deoxidizer, and Sulfur and Copper are elements that are not intentionally added.

The resulting weld deposit is summarized below in Table I:

TABLE I

| | Ni | Mn | C | Si | S | Fe | Cu | Al |
|---|---|---|---|---|---|---|---|---|
| % by weight | 54-64 | 3.5-5.5 | 0.9-1.4 | 0.5 | <0.03 | Rem. | <0.2 | <0.5 |

The welding electrode according to the present invention produces weld deposits in cast irons with greatly enhanced physical properties such as strength and toughness. For example, the weld deposits according to the present invention result in a Charpy V-Notch impact strength of approximately 10-15 foot-pounds, while standard welding electrodes produce weld deposits having a Charpy V-Notch impact strength of approximately 1-9 foot-pounds. A summary of improved weld deposit properties provided by the present invention is provided below in Table II, which are intended to be exemplary only and are not intended to limit the scope of the present invention.

TABLE II

| | Ultimate Tensile Strength | Yield Strength | Elongation | Charpy Impact Strength |
|---|---|---|---|---|
| Preferred Embodiment | 70 ksi | 51 ksi | 8.0% | 12.5 ft-lbs. |
| Typical Electrode | 52 ksi | 48 ksi | 2.0% | <5.0 ft-lbs. |

Accordingly, the compositions according to the present invention result in improved mechanical properties through the reduction in the formation of carbides through the increased amount of Nickel to serve as an austenitic phase stabilizer. Furthermore, the addition of Manganese also produces an austenitic weld deposit, thus reducing the formation of carbides. The coated electrode composition furthermore reduces the arc energy required to weld, which also reduces the formation of carbides. Moreover, the ratio of nodularizing agents, graphitizing agents, and Carbon aid in the formation of nodular graphite, thus producing a less brittle weld deposit.

The coated electrode and weld deposit according to the present invention is preferably used in shielded metal arc welding (SMAW), although other welding processes such as gas metal arc welding (GMAW), submerged arc welding (SAW), and flux core arc welding (FCAW), among others, may also be employed while remaining within the scope of the present invention.

The description of the invention is merely exemplary in nature and, thus, variations that do not depart from the gist of the invention are intended to be within the scope of the invention. For example, the weld deposit according to the teachings of the present invention may be produced from welding wire types other than coated electrodes, such as flux core wire, while remaining within the scope of the present invention. Such variations are not to be regarded as a departure from the spirit and scope of the invention.

What is claimed is:

1. A welding electrode for use in welding cast irons, the welding electrode comprising:
    a core wire comprising approximately 50% Nickel and approximately 50% Iron; and
    a coating on the core wire comprising between approximately 0.3% and approximately 4.0% Magnesium and rare earth metals and oxides, the welding wire producing an austenitic weld deposit composition comprising:
    between approximately 54% and approximately 60% Nickel;
    between approximately 3.5% and approximately 5.5% Manganese; and
    between approximately 0.9% and approximately 1.4% Carbon;
    approximately 0.5% Silicon;
    less than approximately 0.03% Sulfur;
    less than approximately 0.2% Copper; less than approximately 0.5% Aluminum; and
    between approximately 33.0% and approximately 41.5% Iron;
    wherein the weld deposit is carbide-free and the Carbon is present in the form of nodular graphite and
    wherein the weld deposit is carbide-free in a fusion zone and a mixed zone and throughout the weld structure.

2. A cast iron welded structure comprising at least one weld produced from the welding electrode of claim 1.

3. A method of welding cast iron, the method comprising the step of using the welding electrode of claim 1 to produce the weld deposit composition.

4. The method according to claim 3, wherein the welding comprises a process selected from a group consisting of GMAW, SMAW, SAW, and FCAW.

5. A welding electrode comprising a core wire that is approximately 50% Nickel and having a coating comprising between approximately 0.3% and approximately 3.0% Magnesium and rare earth metals and oxides that is capable of producing an austenitic weld deposit comprising:
    between approximately 54% and approximately 60% Nickel;
    between approximately 3.5% and approximately 5.5% Manganese; and
    between approximately 0.9% and approximately 1.4% Carbon, approximately 0.5% Silicon;
less than approximately 0.03% Sulfur;
less than approximately 0.2% Copper;
less than approximately 0.5% Aluminum; and
between approximately 33.0% and approximately 41.5% Iron,
wherein the weld deposit is carbide-free and the Carbon is present in the form of nodular graphite and
wherein the weld deposit is carbide-free in a fusion zone and a mixed zone and throughout the weld structure.

\* \* \* \* \*